United States Patent [19]
Bohnert

[11] 4,084,205
[45] Apr. 11, 1978

[54] PHASE MONITORING ARRANGEMENT FOR A THREE PHASE NETWORK SUPPLYING A D.C. MOTOR THROUGH A CONTROLLED CONVERTER

[75] Inventor: Ulrich Bohnert, Leerstetten, Germany

[73] Assignee: Siemens Aktiengesellschaft, Munich, Germany

[21] Appl. No.: 727,694

[22] Filed: Sep. 28, 1976

[30] Foreign Application Priority Data

Sep. 29, 1975  Germany .............................. 2543467

[51] Int. Cl.² ............................................. H02H 3/26
[52] U.S. Cl. ...................................... 361/76; 361/77; 361/92
[58] Field of Search ..................... 361/76, 77, 33, 23, 361/85, 86; 318/479, DIG. 1, 453, 458; 324/86, 108, 107

[56] References Cited

U.S. PATENT DOCUMENTS

| | | | |
|---|---|---|---|
| 2,858,457 | 10/1958 | Epstein et al. | 361/86 X |
| 3,401,308 | 9/1968 | Darke | 361/76 |
| 3,551,748 | 12/1970 | Maynard et al. | 361/76 |

Primary Examiner—J D Miller
Assistant Examiner—Patrick R. Salce
Attorney, Agent, or Firm—Kenyon & Kenyon, Reilly, Carr & Chapin

[57] ABSTRACT

In a phase monitoring arrangement for a three phase network which supplies a controlled d.c. motor through a controlled converter, a power line dependent discriminator along with R-C circuits forms a smoothed, rectified monitoring voltage which depends on the phase sequence and is sensitive thereto and to phase failure along with a supplementary monitoring voltage dependent only on phase failure, the rectified monitoring voltage and supplementary monitoring voltage being supplied to an evaluating circuit comprising differential comparing amplifiers at which the monitoring voltages are compared with constant reference voltages independent of faults and the output thereof used to control switching means and a current regulator so that in the event of incorrect phase sequence or of a phase failure, the switching means feed a blocking signal which suppresses firing pulses to the controlled converter and the current regulator feeds a control signal to control the converter to its operating limit.

9 Claims, 3 Drawing Figures

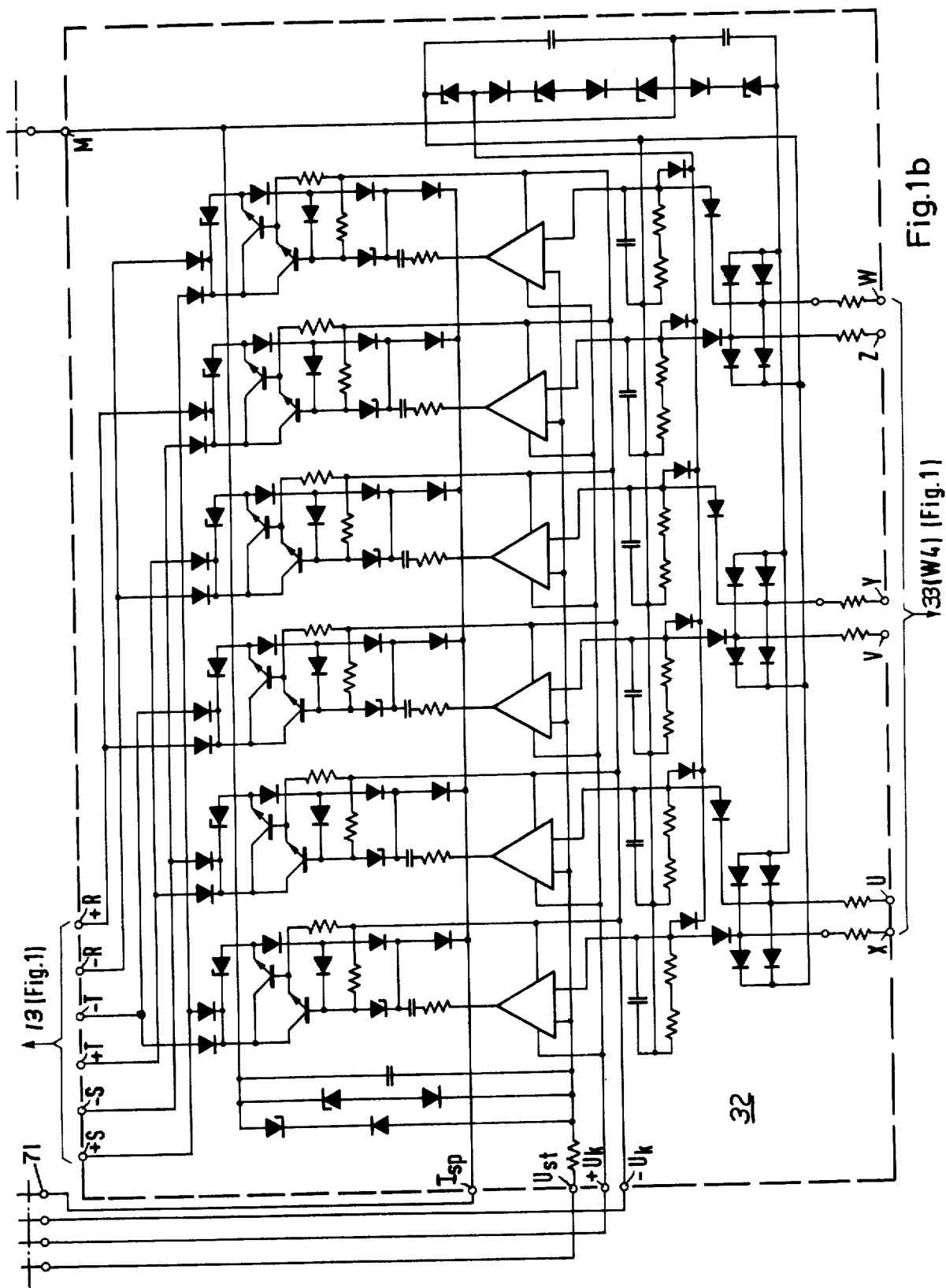

PHASE MONITORING ARRANGEMENT FOR A THREE PHASE NETWORK SUPPLYING A D.C. MOTOR THROUGH A CONTROLLED CONVERTER

BACKGROUND OF THE INVENTION

This invention relates to d.c. motors fed by controlled converters in general and more particularly to a phase monitoring arrangement for a three phase network from which such motor is supplied which insures that operation that can be damaging to the motor or converter will not take place in the case of improper phase sequence or phase failure.

D.C. motors which are controlled by controlled converters in a three phase bridge circuit and which have their field circuits supplied by a rectifier bridge with a regulator providing inputs to a control circuit for generating firing pulses for the converter are known. In such devices, there is also provided a d.c. power supply to supply the necessary d.c. current to the regulator control circuit and the converter.

In drives of this nature, there is a danger to the converter, and particularly to their controlled switching elements, e.g., thyristors, which are sensitive to overloads if they are connected to the motor with the rotating field reversed because of an incorrect phase sequence. Similar problems occur in the event of a phase failure in the a.c. supply network. In particular, if a phase of the network fails there is a great danger, particularly if the failure occurs during the "standstill" control of the d.c. motor. The reason for this is that in the event of a failure of a phase of the network, the three phase bridge circuit of the converter operates like a single phase bridge circuit and the current regulator draws the required bridge current for the d.c. motor from the network through correspondingly fewer switching elements. This leads to larger a.c. currents in the inverter input and larger currents through the switching elements. Furthermore, the current ripple becomes larger and is accompanied by a degradation of the commutating properties resulting in brush arcing. Furthermore, with the smoothing of the actual current value input being the same, too low an actual current value is provided as an input to the current regulator. This causes the current limitation to be raised. Since the current transformer in the network feed line which is provided for measuring the actual current value is connected only to two phases, the actual current value provided as an input through the current regulator is reduced to less than one half if one of these phases fails. As a result, the current limitation assumes more than twice the value of the set magnitude and thus becomes practically ineffective as far as the switching elements are concerned. The greatest danger exists if a phase fails during standstill since the firing pulses are close to the inverter control limit of the three phase bridge circuit and a considerable residual voltage of $\sqrt{2}U$ sine 30° is present on the d.c. side where a control angle of $\alpha = 150°$ is set for the effective a.c. bridge. This residual voltage drives a large motor current, limited only by the ohmic resistance of the armature and therefor drives a large current through the switching elements.

In view of these problems, the need for a phase monitor which is capable of monitoring phase failures and phase sequence and of shuting down the d.c. motors where conditions which are not compatible with proper operation occur in order to protect the converter against overload becomes evident.

SUMMARY OF THE INVENTION

The present invention solves this problem through the use of a discriminator which is supplied from the power line transformer. The discriminator forms a smoothed, rectified monitoring voltage which depends on the phase sequence and phase failure utilizing R-C members. It also supplies a supplementary rectified and smoothed monitoring voltage which depends only on phase failure. The monitoring voltage and supplementary monitoring voltage from the discriminator are compared in an evaluating circuit with a constant reference voltage. The output signals obtained from the comparision are utilized to control switching means connected in parallel along with a current regulator for the control permitting a blocking signal for suppressing the firing pulses to be delivered through the switching means of the control circuit and a blocking control signal to be delivered from the current regulator for controlling the inverter control limit of the converter in the case of an incorrect phase sequence when the motor is switched on or in the case of a phase failure.

Disclosed is a particularly simple circuit for the discriminator. In this circuit, two phases of a secondary winding of the power line transformer are connected to each other in a V connection and two equal R-C members connected to this V connection. Connected to the two R-C members is a first rectifier bridge and a parallel storage capacitor. A second rectifier bridge is provided along with a parallel storage capacitor and this bridge separately connected to the third phase of the secondary winding. The first rectifier bridge supplies the monitoring voltage and second rectifier bridge the supplementary monitoring voltage.

BRIEF DESCRIPTION OF THE DRAWINGS

FIGS. 1, 1a and 1b are a circuit-block diagram of an inverter controlled d.c. motor illustrating the phase monitoring arrangement of the present invention.

DETAILED DESCRIPTION OF THE INVENTION

Figure 1:
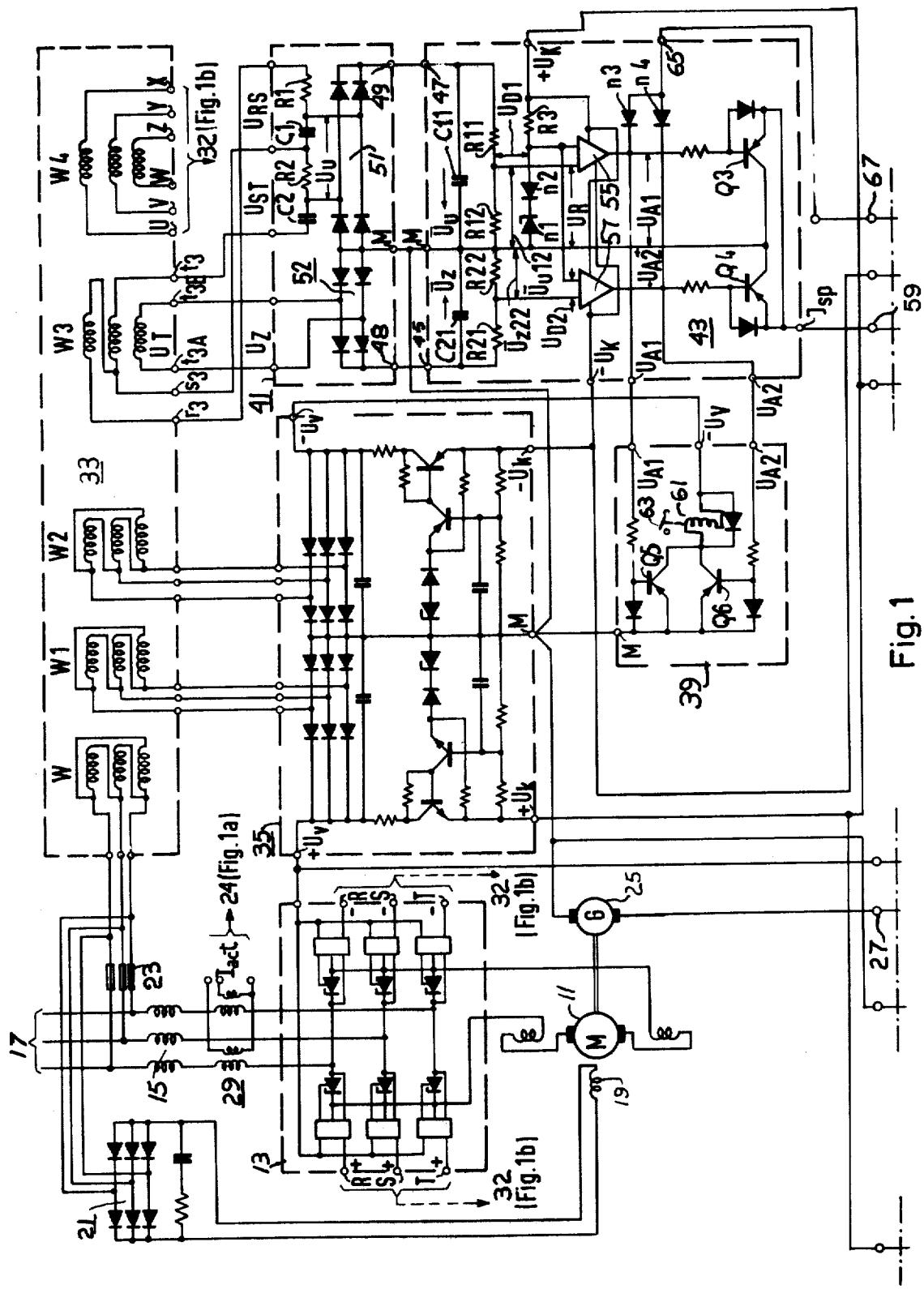
Figure 1A:
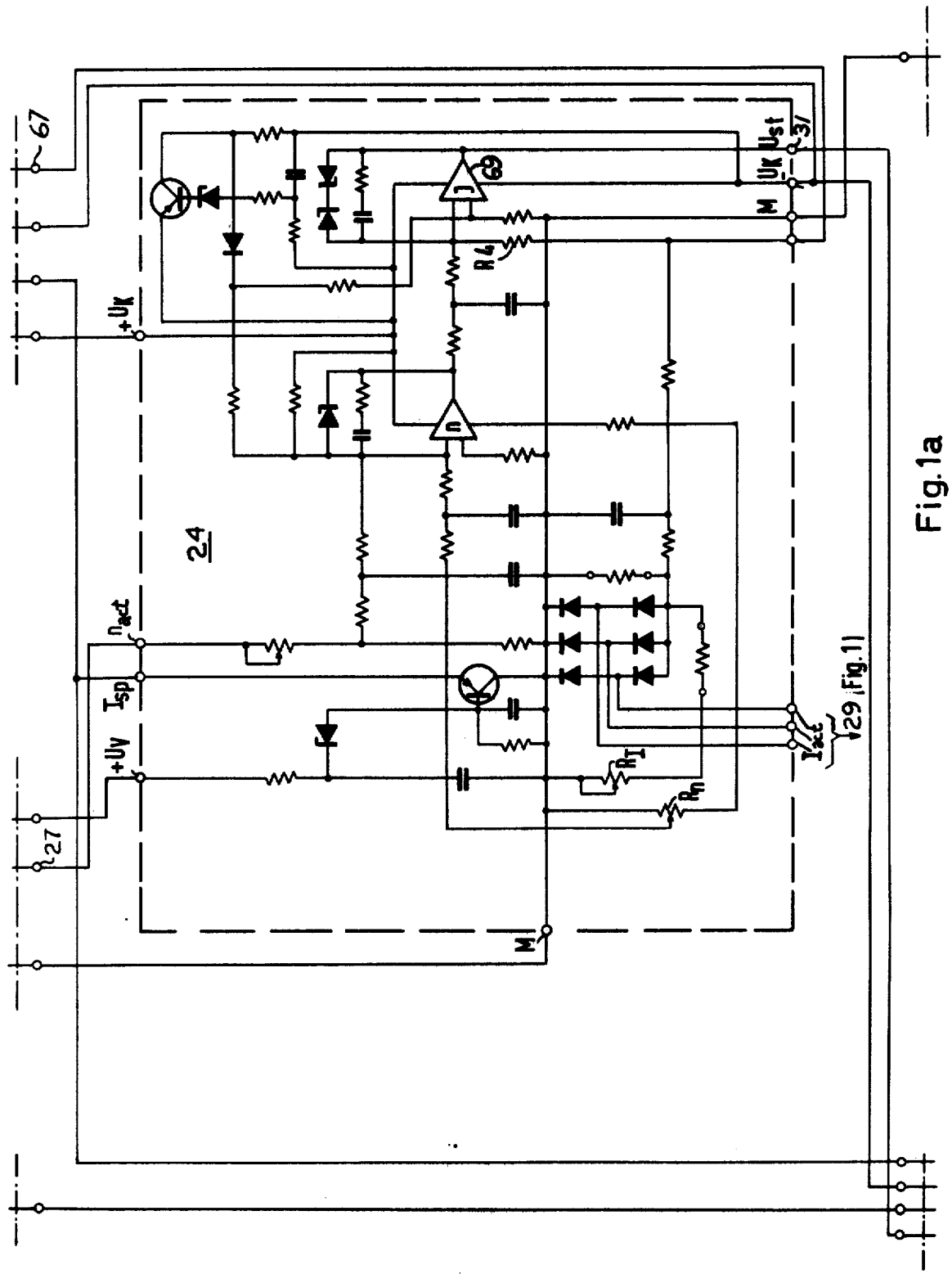

For completeness, the whole inverter control system for the d.c. motor has been shown on FIGS. 1, 1a and 1b. However, since the majority of this circuitry is conventional, only those portions which are necessary for an understanding of the phase monitoring arrangement of the present invention will be explained in detail. Shown on FIG. 1 is a motor 11 which can be regulated and controlled in a well known manner utilizing a converter 13 coupled through chokes 15 to a.c. network 17. The field winding 19 of the motor 11 is supplied from an uncontrolled rectifier bridge 21 which is coupled to the a.c. network 17 through fuses 23. The current and speed of the d.c. motor 11 are controlled by means of a known control system illustrated on FIG. 1a. This control system receives as inputs the actual speed value $n_{act}$ developed in a tachometer generator 25 shown on FIG. 1. This voltage representing the actual speed is supplied to a terminal 27 shown both on FIG. 1 and FIG. 1a. The tachometer generator 25 is coupled to the shaft of motor 11 as illustrated. The second input to the control system 24 is an actual current value $I_{act}$ obtained from a current transformer 29 shown on FIG. 1. As illustrated, the current transformer is disposed in the supply to the inverter 13. Desired value inputs for the controller are set at resistors $R_n$ and $R_I$ which are used to set respectively, the desired speed $n_d$ and the desired current $I_d$. In conventional fashion, the desired values are compared with the actual values to develop a necessary control voltage $U_{st}$ shown at terminal 31 for the inverter 13. This output is supplied to the inverter control circuit 32 illustrated on FIG. 1b, this circuit also being of conventional design.

The present invention provides for this known control arrangement a phase monitoring system which permits monitoring of the individual phases for failures as well as monitoring all three phases for phase sequence over a wide range of variation in the network voltage. As will become evident below, the outputs developed by the phase monitoring arrangement are used to influence both the control system 24 of FIG. 1a and the firing control circuit 32 of FIG. 1b. In accordance with the present invention, a transformer 33 is coupled to the three phases of the network 17 through the fuses 23. Transformer 33 has a primary winding W and secondary windings W1, W2, W3 and W4. The secondary windings W1 and W2 along with the primary winding W are all delta connected. The two secondary windings W1 and W2 feed a three phase rectifier bridge in a regulated power supply 35. The rectifier bridge itself develops voltages $+U_r$ and $-U_r$ referenced to a common point designated M. The regulated portion of the power supply 35 develops voltages $+U_k$ and $-U_k$ also referenced to the reference point M. The voltage $+U_r$ is supplied as an input to the control system of FIG. 1a and is also used for supplying the firing current to the thyristors in converter 13 through conventional protection circuits 37. (These circuits, of course, also receive the firing inputs developed in the firing control circuit of FIG. 1b as indicated by $+R$, $+S$, $+T$, $-R$, $-S$ and $-T$.) The voltage $-U_V$ is provided as an input to an indicating circuit 30 to be described in more detail below.

The regulated voltage $+U_k$ and $-U_k$ because of the regulation are independent of disturbances and remain unchanged even in the case of a failure of a network phase. This is accomplished by using capacitors in the circuit which are of sufficiently large size. These voltages are used as the d.c. power supply for the control circuit 24 of FIG. 1a and the firing control circuit 32 of FIG. 1b. The winding W4 of the transformer 33 is also coupled to the circuit of FIG. 1b so as to synchronize it with the line voltage 17 in known fashion.

The phase monitoring arrangement of the present invention includes a discriminator 41, an evaluating circuit 43 and the indicating circuit 39. In addition to having a terminal for the reference point M, evaluating circuit 43 has two input terminals 45 and 47. These are coupled to respective output terminals 48 and 49 of the discriminator circuit 41. The monitoring voltage is present at the terminal 47 and the supplementary monitoring voltage at 45. These monitoring voltages are developed in the discriminator 41. Inputs thereto are obtained from the winding W3 of the transformer 33. As illustrated, two of the phase windings of this secondary winding are connected in a V connection. The two free ends of the V connected windings are coupled across two R-C members in series. The one R-C member is made up of a capacitor C1 and resistor R1 and the second of a capacitor C2 and resistor R2. Across the R-C member made up of capacitor C1 and resistor R1 the voltage $U_{RS}$ is developed and across the other R-C member, the voltage $U_{ST}$. The junction points of the two R-C members are taken off and provide the inputs to a rectifier bridge 51. The input to this bridge is designated $U_U$. The third winding is separately coupled as the input to a second bridge 52 at which input point the voltage $U_z$ appears.

The R-C members have equal resistors as well equal capacitors and are designed so that $$R1 = R2 = |1/j\omega C1| = |1/j\omega C2|$$

The secondary voltages $U_{RS}$ and $U_{ST}$ are equal to U during undisturbed operation. As a result, at the series circuit made up of capacitor C1 and resistor R2, where the voltage $U_U$ is taken off and fed to the rectifier bridge 51, there will be a voltage which is dependent on the phase sequence. If the phase sequence is incorrect (rotating to the left) the voltage appearing will be as follows:

$$U_{U1} = U \cdot \sqrt{2} \cdot \sin 15° = 0.366 \; U.$$

For the correct sequence (rotating to the right) the voltage will be $$U_{U2} = U \cdot \sqrt{2} \cdot \cos 15° = 1.336 \; U.$$

If one of the phases R or T fail on the primary side then the monitoring voltage which will be taken off at the series circuit of C1 and R2 is as follows:

$$U_{U3} = \sqrt{\left(\frac{1}{\sqrt{2}}\right)^2 + \left(\frac{1}{2\sqrt{2}}\right)^2} \cdot U = 0.791 \; U.$$

If the phase S fails, however, the voltage will be $$U_{U4} = 0.5 \; U.$$

Thus, the ratio of the monitoring voltage values to the voltage U varies depending on the conditions described above and may take the value 0.366, 0.5, 0.791 and 1.366. These differences which occur in the event of a failure of the phases R, S. or T do not alone permit the circuit to have the same range of operation for all three phases over an extended voltage range of the line voltage and for all network frequencies. In order to have such a capability the separate monitoring voltage $U_z$ from the third phase of the secondary winding W3 coupled to the rectifier 52 and providing an output voltage of the same value but rectified is used. The voltage $U_z$ during normal operation will be equal to the voltage $U_T$ equal to the voltage U independent of phase sequence. If the phase S fails, it will still have the value U. On the other hand, it will have a value equal to 0.5 U if the phase R or T fails. Thus, the following table may be established showing the relationship between the monitoring voltage and supplementary monitoring voltage to the voltage U.

| $U_U/U$ | $U_Z/U$ | Operation |
|---|---|---|
| 1.366 | 1.0 | Correct phase sequence, undisturbed condition of the phases |
| 0.366 | 1.0 | incorrect phase sequence when put into operation, undisturbed condition of the phases |
| 0.791 | 0.5 | failure of phase R |
| 0.5 | 1.0 | failure of phase S |
| 0.791 | 0.5 | failure of phase T. |

As indicated above, the monitoring voltage $U_U$ is rectified in the bridge 51 and the supplementary monitoring voltage $U_z$ in the bridge 52 to provide the respective outputs at terminals 49 and 48 which are fed to the terminals 47 and 45 of the evaluation device 43. In the device 43, storage capacitors C21 and C11 are provided between the reference point M and the terminals 45 and 47 respectively. Thus, across these capacitors the rectified monitoring and supplementary monitoring voltages designated $\overline{U}_U$ and $\overline{U}_Z$ are present. The magnitudes of these voltages correspond approximately to the peak values of the corresponding variables. As is evident and indicated above, both bridges and the capacitors are referenced to the point M. Across the capacitor C11 is a resistive voltage divider made up of the resistors R11 and R12. Similarly, across the capacitor C21 is a voltage divider made up of the resistors R21 and R22. Voltages $\overline{U}_{Z22}$ and $\overline{U}_{U12}$ with respect to the reference point M are then taken off these voltage dividers. These voltages supply the inputs to differential amplifiers 55 and 57 respectively which are connected as comparators. At the differential amplifiers, they are compared with a voltage $U_R$ which is obtained from a voltage regulator network made up of a resistor R3, a diode N2 and a zener diode N1 coupled between the reference point M and the regulated voltage $+U_k$. Thus, appearing at the input of the differential amplifier 55 will be difference voltage $U_{D1}$ and at the input of the differential amplifier 57 a voltage $U_{D2}$. These are respectively the differences between the voltage $U_R$ and the voltage $\overline{U}_{U12}$ and between $U_R$ and $\overline{U}_{Z22}$. The differential amplifiers operate as comparators such that either a positive or negative voltage $U_{A1}$ or $U_{A2}$ will appear at their respective outputs. The circuit with the differential amplifiers 55 and 57 is arranged such that the following is satisfied:

$\overline{U}_{U12} > U_R$ results in $U_{D1} > 0$ and yields $+U_{A1}$
$\overline{U}_{U12} < U_R$ results in $U_{D1} < 0$ and yields $-U_{A1}$
$\overline{U}_{Z22} > U_R$ results in $U_{D2} > 0$ and yields $+U_{A2}$
$\overline{U}_{Z22} < U_R$ results in $U_{D2} < 0$ and yields $-U_{A2}$ The output voltages $U_{A1}$ and $U_{A2}$ are fed respectively to the bases of transistors Q3 and Q4. Transistors Q3 and Q4 are coupled in parallel with their collectors coupled to the reference potential M and their emitters tied together and to an output terminal 59 at which their output $I_{sp}$ is supplied. This output is used in a manner to be more fully described below. The voltage $U_{A1}$ and $U_{A2}$ are also fed to transistors Q5 and Q6 in the indicating unit 39. These transistors are also connected in parallel with their emitters coupled to the reference point M and their collectors tied together and to one side of a relay coil 61, the other side of which is connected to the voltage $-U_V$. The contact 63 of relay 61 may then be used to drive an indicating device. The amplifier outputs $U_{A1}$ and $U_{A2}$ are also coupled through diodes N3 and N4 of FIG. 1 to terminal 65 which is coupled to a terminal 67 also shown on FIG. 1a. It is from that point coupled through a resistor R4 to one input of the current regulating amplifier 69 of the control system 24 of FIG. 1a. The other input of the amplifier 69 is coupled through a resistor to the reference point M. The output of the amplifier 69 is the control signal $U_{st}$ which is the control input to the firing control circuit 32 of FIG. 1b. The signal $I_{sp}$ of FIG. 1 is also an input to this circuit at terminal 71.

In the case of an incorrect phase sequence connection or the failure of phase S, the differential amplifier 55 has a negative output voltage $-U_{A1}$. If the phase R or T fails, both differential amplifiers 55 and 57 have negative output voltages $-U_{A1}$ and $-U_{A2}$, respectively. As a result in case of any kind of a failure, either one or both of the transistors Q3 and Q4 will become conductive resulting in the blocking signal $I_{sp}$ appearing at terminal 59. In addition, at the same time in every case, corresponding negative signals will appear at terminal 65 and will be fed through the resistor R4 to the amplifier 69 of FIG. 1a. The signal $I_{sp}$ at the input terminal 71 of FIG. 1b blocks the output of the circuit shown thereon. In other words, the firing pulses which normally appear at the output terminals and which are fed to converter 13 of FIG. 1 are blocked. The signal at the input of the amplifier 69 of FIG. 1a results in a larger current value being simulated. This causes the amplifier 69, which is the current regulator, to deliver a positive output signal $U_{st}$ which is also fed to the circuit 32 of the FIG. 1b. This causes the firing control circuit 32 to control the converter 13 toward the inverter control limit. In other words, it results in a shift of the firing pulses toward that limit. Of course, these firing pulses do not reach the inverter because of a blocking effect of the signal $I_{sp}$. At the same time, the negative signal or signals $U_{A1}$ and $U_{A2}$ will cause the transistors Q5 and Q6 in the indicating circuit 39 to be conductive actuating the relay 61 to close the contacts 63 to give an external indication such as by light or sound. Thus, upon a failure in one of phases or an incorrect phase sequence, the inverter is immediately shut down, the control circuit controlled toward the inverter limit and an output indication given. At this point, the trouble may be investigated and corrected.

Once the trouble is corrected, which may be a reversal of inputs to establish the proper phase sequence or a correction so that all phases are again present, the signal $I_{sp}$ will be removed as will be the input to the amplifier 69 through the resistor R4 on FIG. 1a. However, the amplifier 69 is connected as an integral controller and will not immediately change its output because of the capacitor in its feedback path. This results in a control delay for the current regulator amplifier 69. As a result, the motor 11 will be gradually brought up to the speed determined by the speed control potentiometer $R_n$ and to a current determined by the setting of the potentiometer $R_j$. Through the feeding of an additional control voltage through the resistor R4 to the current controller 69 when a disturbance occurs, the firing pulses are automatically shifted to the inverter locking limit and remain in this end position indicating that the rectifier voltage is at zero, so that, when the trouble is eliminated, operation is resumed from this end position with the voltage increasing from zero. Thus, in all cases excessive current peaks which could occur when the trouble is eliminated if the position of the control pulses was not defined, are avoided. Therefore, additional control of the rotating field at the start of operation is unnecessary since the drive will not start if, upon switching on, the phase sequence is incorrect. Thus, if the drive does not start it is only necessary to interchange two of the network phases.

The monitoring of the phases using the arrangement of the present invention is continuously effective, i.e. it also operates when the motor is standing still. This is a particular advantage since it is in such a case that a phase failure can be most damaging. As noted above, under such conditions the large current drain, which overloads the converter, results in a degradation of commutation and brush arcing and a simulation of an actual current value that is too low with an increasing current limitation occur.

I claim:

1. A phase monitoring arrangement for a three phase network supplying a controllable d.c. motor through a controlled converter having a three phase bridge circuit with a rectifier bridge supplying the field circuit of the motor, said controlled converter having a control circuit generating firing pulses therefor which receives a control input from a regulator circuit, with the regulator circuit, firing pulse control circuit and converter supplied with d.c. current from a power supply coupled to the line through a power line transformer, comprising:

(a) a discriminator coupled to the power line transformer for providing a smoothed monitoring voltage which is dependent on phase sequence and phase failures and a rectified and smoothed supplementary monitoring voltage which depends only on phase failures;

(b) an evaluating circuit having as inputs said monitoring and supplementary monitoring voltage and a constant reference voltage, said evaluating circuit providing first and second output signals if either said monitoring voltage or said supplementary monitoring voltage differ from said constant reference voltage by a predetermined amount;

(c) means coupling said first output signal as a blocking input to said firing pulse control circuit; and (d) means coupling said second output signal as a control input to said regulator circuit to cause said regulator circuit to control said firing control circuit to the control limit of the converter.

2. Apparatus according to claim 1 wherein said evaluating circuit includes first comparator means and second comaparator means for respectively comparing said monitoring voltage and supplementary monitoring voltage with said reference voltage, said first and second comparator means providing an output voltage of a first polarity in the absence of a failure and an output voltage of opposite polarity in the case of a failure, and switching means controlled by the outputs of said comparator means for providing said first signal and means coupled to the output of said two comparator means for providing said second signal.

3. Apparatus according to claim 2 and further including indicator means coupled to the outputs of said comparator means.

4. Apparatus according to claim 2 wherein said indicator means comprises switching means having as inputs the outputs of said comparator means and a relay coupled to the output of said switching means.

5. Apparatus according to claim 4 wherein said switching means comprise first and second switching transistors having their collector-emitter circuits coupled in parallel and in series with said relay, the outputs of said comparator means being coupled respectively to the bases of said first and second transistors.

6. Apparatus according to claim 1 wherein said discriminator comprises:

(a) a secondary winding of said transformer having two phase windings V connected;

(b) first and second equal R-C members coupled in series the junction point between said two R-C members coupled to the common point of said V connection and the two ends of said series connection of said two R-C members coupled to the ends of said two windings;

(c) a first rectifier bridge having its input coupled to the series circuit of said R-C members;

(d) a third secondary winding of said transformer;

(e) a second rectifier bridge having its input coupled to said third phase winding; and (f) first and second storage capacitors coupled respectively across the outputs of said first and second rectifier bridges, whereby said first rectifier bridge supplies said monitoring voltage and said second recifier bridge said supplementary monitoring voltage.

7. Apparatus according to claim 6 wherein said evaluating circuit comprises:

(a) first and second comparing differential amplifiers;

(b) means for supplying a constant reference voltage which is free of disturbances as a reference input to each of said amplifiers, the first of said amplifiers having coupled as a second input said monitoring voltage and the second having as a second input said supplementary monitoring voltage;

(c) first and second switching transistors having their emitter-collector paths coupled in parallel, the bases of said first and second transistors being coupled respectively to the outputs of said first and second amplifiers, said paralleled switching transistors supplying said first output signal;

(d) first and second diodes each having one terminal coupled respectively to the output of said first and second amplifiers and a second terminal connected together supplying said second output signal, and wherein said means coupling said second output signal to said regulator circuit comprises a resistor coupling said common terminal of said diodes to said regulator.

8. Apparatus according to claim 7 wherein said indicator means comprise:

a relay, third and fourth switching transistors having their collector-emitter circuits coupled in parallel and in series with said relay, the bases of said third and fourth transistors coupled respectively to the outputs of said first and second differential amplifiers.

9. Apparatus according to claim 1 wherein said evaluating circuit comprises:

(a) first and second comparing differential amplifiers;

(b) means for supplying a constant reference voltage which is free of disturbances as a reference input to each of said amplifiers, the first of said amplifiers having coupled as a second input said monitoring voltage and the second having as a second input said supplementary monitoring voltage;

(c) first and second switching transistors having their emitter-collector paths coupled in parallel, the bases of said first and second transistors being coupled respectively to the outputs of said first and second amplifiers, said paralleled switching transistors supplying said first output signal;

(d) first and second diodes each having one terminal coupled respectively to the output of said first and second amplifiers and a second terminal connected together supplying said second output signal, and wherein said means coupling said second output signal to said regulator circuit comprises a resistor coupling said common terminal of said diodes to said regulator.

* * * * *

UNITED STATES PATENT OFFICE
CERTIFICATE OF CORRECTION

Patent No. 4,084,205           Dated April 11, 1978

Inventor(s) Ulrich Bohnert

It is certified that error appears in the above-identified patent and that said Letters Patent are hereby corrected as shown below:

Figure 1 of the drawing, extend the arrow the right hand side of the symbol $U_R$ to the right hand input of the amplifier $P_1$.

Signed and Sealed this

*Twenty-first* Day of *November 1978*

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 4,084,205　　　　　　　　　Dated April 11, 1978

Inventor(s) Ulrich Bohnert

It is certified that error appears in the above-identified patent and that said Letters Patent are hereby corrected as shown below:

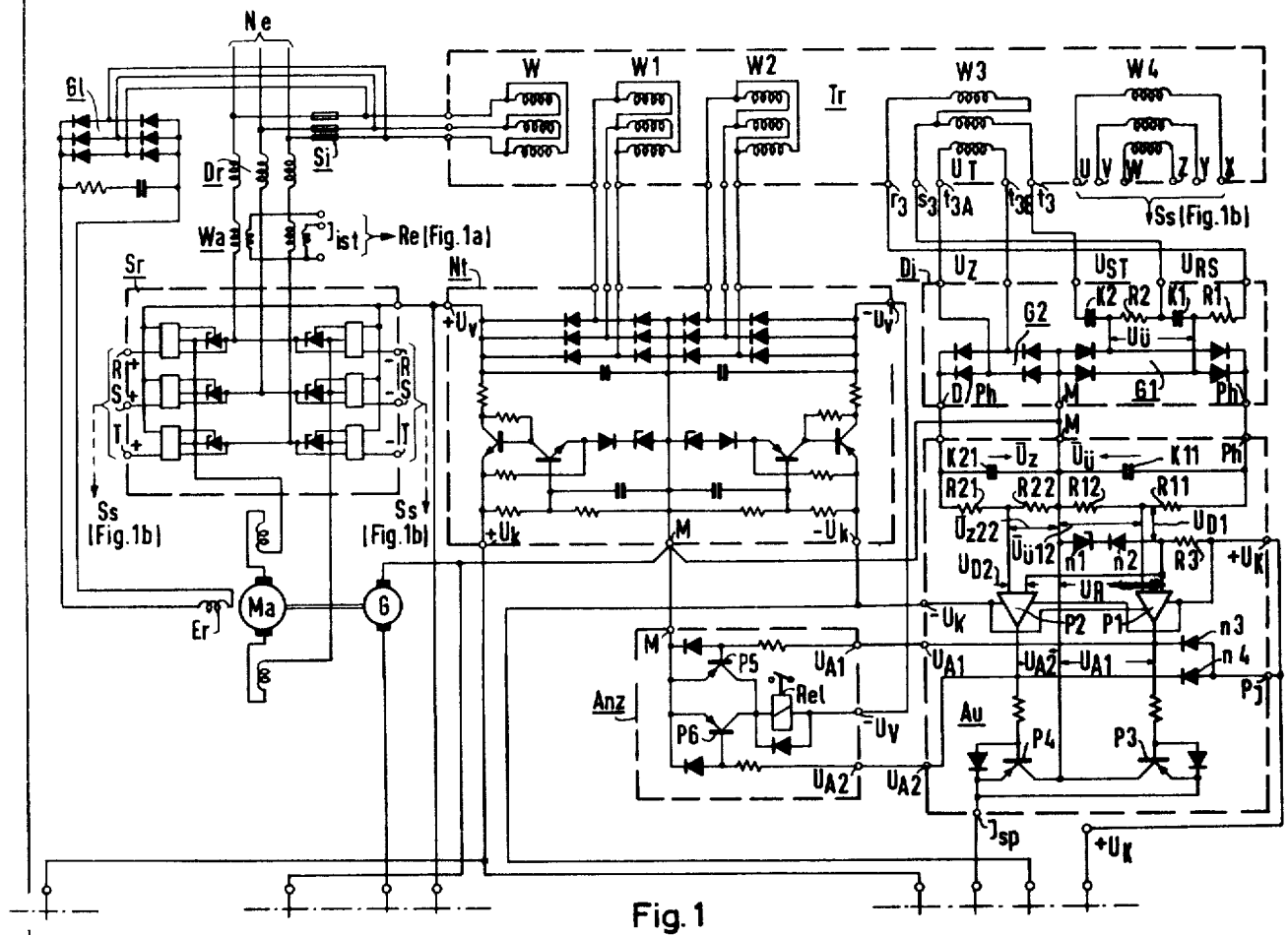

Fig. 1